US012602323B2

(12) United States Patent
Yang et al.

(10) Patent No.: US 12,602,323 B2
(45) Date of Patent: Apr. 14, 2026

(54) SYSTEMS AND METHODS OF CACHE DATA PLACEMENT

(71) Applicant: Samsung Electronics Co., Ltd., Suwon-si (KR)

(72) Inventors: Jing Yang, Glen Allen, VA (US); Ho Bin Lee, San Jose, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/677,868

(22) Filed: May 29, 2024

(65) Prior Publication Data

US 2025/0265190 A1    Aug. 21, 2025

Related U.S. Application Data

(60) Provisional application No. 63/556,383, filed on Feb. 21, 2024.

(51) Int. Cl.
G06F 12/08 (2016.01)
G06F 12/0802 (2016.01)

(52) U.S. Cl.
CPC ...... G06F 12/0802 (2013.01); G06F 2212/60 (2013.01)

(58) Field of Classification Search
CPC ......................... G06F 12/0802; G06F 2212/60
See application file for complete search history.

(56) References Cited

U.S. PATENT DOCUMENTS

| | | |
|---|---|---|
| 8,930,624 B2 | 1/2015 | Benhase et al. |
| 10,372,342 B2 | 8/2019 | Dusija et al. |
| 11,243,718 B2 | 2/2022 | Song |
| 11,550,732 B2 | 1/2023 | Gupta et al. |
| 11,609,858 B2 | 3/2023 | Tian et al. |
| 2015/0039836 A1 * | 2/2015 | Wang .................. G06F 12/0804 711/136 |
| 2021/0357329 A1 | 11/2021 | Oh |
| 2022/0004495 A1 | 1/2022 | Natarajan et al. |
| 2023/0376227 A1 | 11/2023 | Navon et al. |

* cited by examiner

*Primary Examiner* — Jae U Yu

(74) *Attorney, Agent, or Firm* — Renaissance IP Law Group LLP

(57) ABSTRACT

Provided are systems, methods, and apparatuses for assisted cache data placement. In one or more examples, systems, methods, and apparatuses include assigning a first identifier to first data based on an aspect of the first data, the first data being data moved from a cache and assigning a second identifier to second data based on an aspect of the second data, the second data being moved to a storage device based on a policy of the cache. In one or more examples, systems, methods, and apparatuses include storing the first data in a first storage location of the storage device based on the first identifier and storing the second data in a second storage location of the storage device based on the second identifier.

20 Claims, 10 Drawing Sheets

600

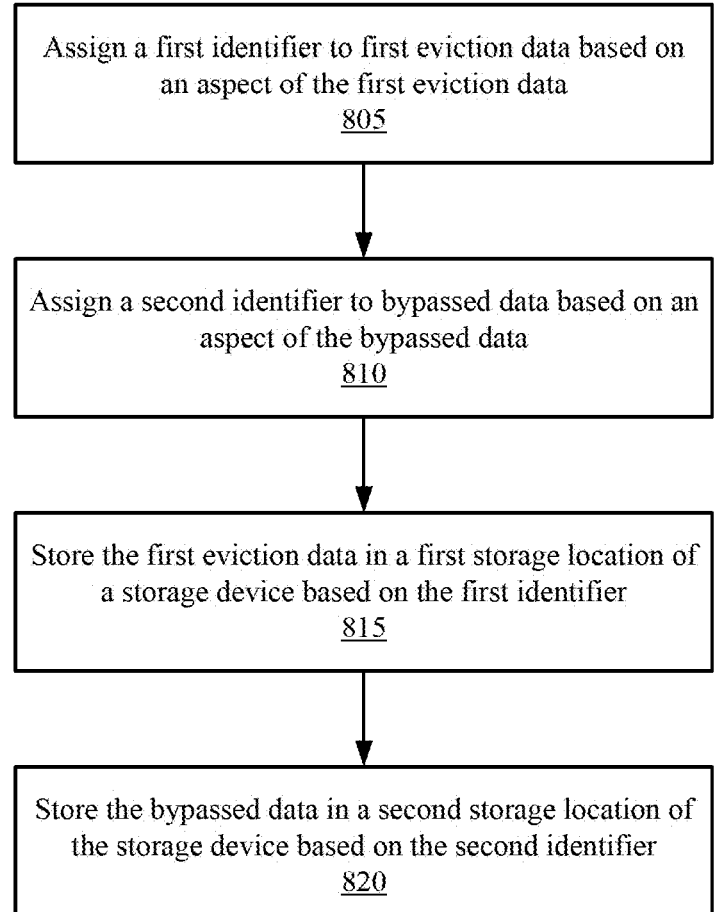

Assign a first identifier to first eviction data based on an aspect of the first eviction data
805

Assign a second identifier to bypassed data based on an aspect of the bypassed data
810

Store the first eviction data in a first storage location of a storage device based on the first identifier
815

Store the bypassed data in a second storage location of the storage device based on the second identifier
820

FIG. 8

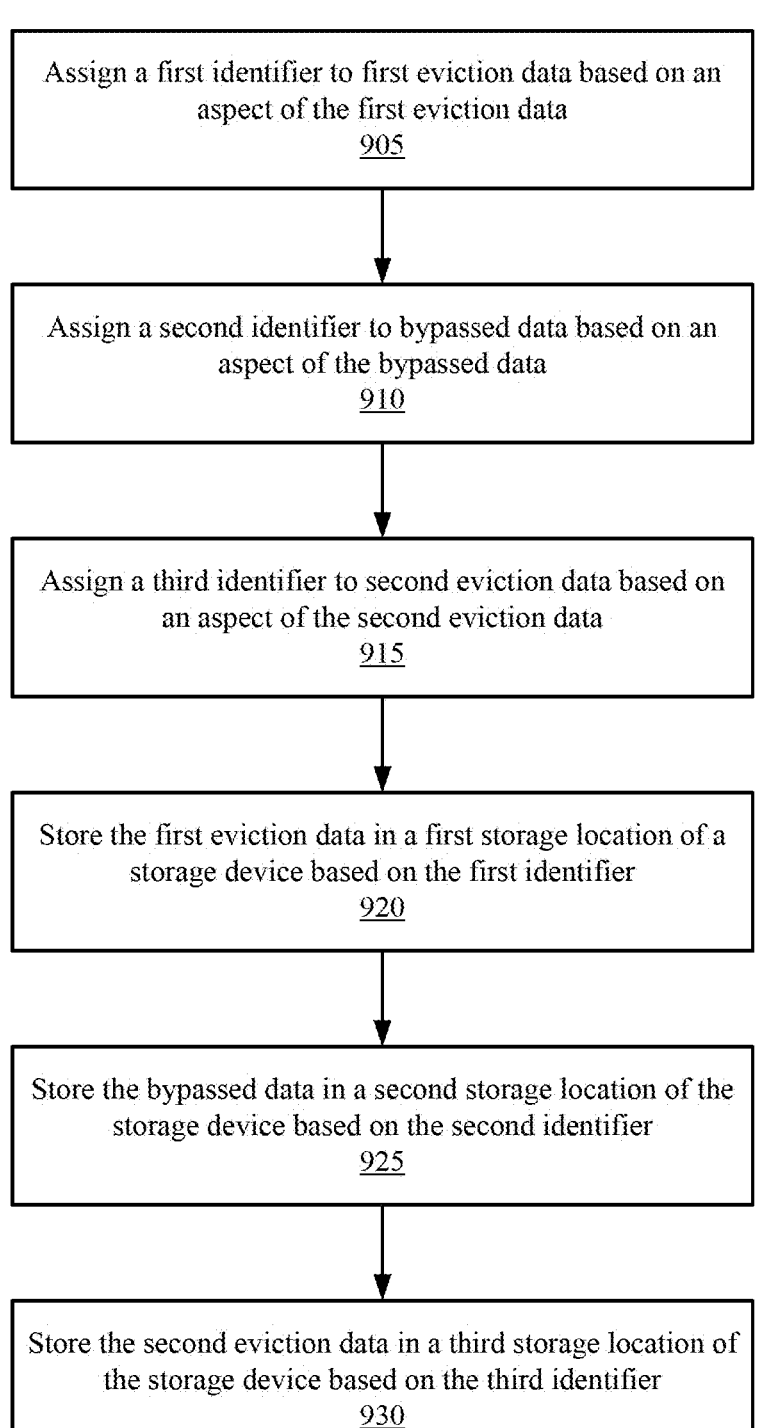

Assign a first identifier to first eviction data based on an aspect of the first eviction data
905

Assign a second identifier to bypassed data based on an aspect of the bypassed data
910

Assign a third identifier to second eviction data based on an aspect of the second eviction data
915

Store the first eviction data in a first storage location of a storage device based on the first identifier
920

Store the bypassed data in a second storage location of the storage device based on the second identifier
925

Store the second eviction data in a third storage location of the storage device based on the third identifier
930

FIG. 9

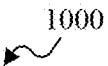

1000

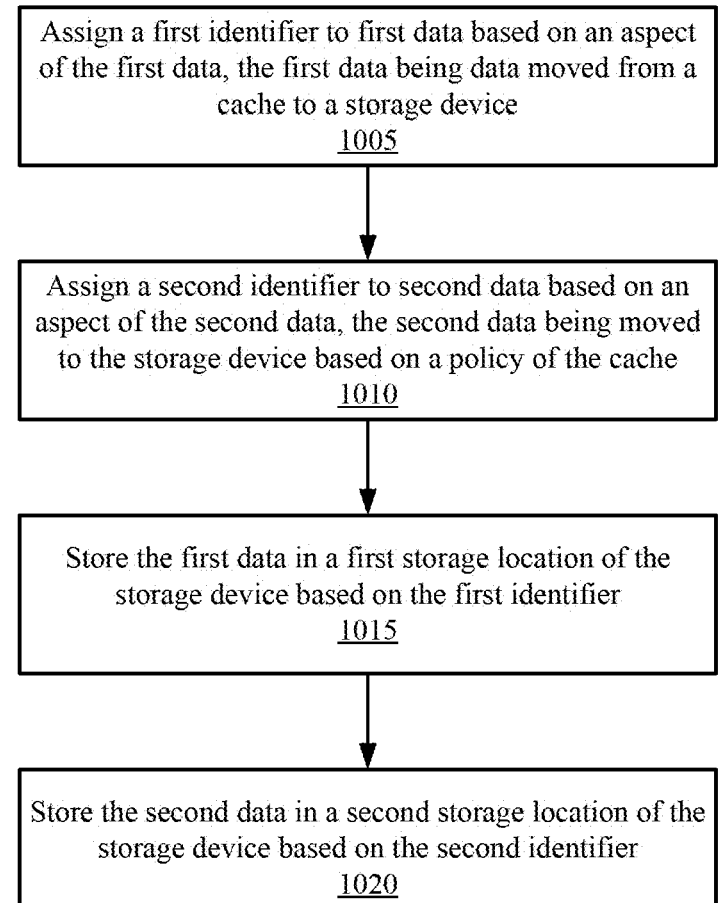

Assign a first identifier to first data based on an aspect of the first data, the first data being data moved from a cache to a storage device
1005

Assign a second identifier to second data based on an aspect of the second data, the second data being moved to the storage device based on a policy of the cache
1010

Store the first data in a first storage location of the storage device based on the first identifier
1015

Store the second data in a second storage location of the storage device based on the second identifier
1020

FIG. 10

SYSTEMS AND METHODS OF CACHE DATA PLACEMENT

CROSS-REFERENCE TO RELATED APPLICATIONS

This application claims the benefit of U.S. Provisional Patent Application Ser. No. 63/556,383, filed Feb. 21, 2024, which is incorporated by reference herein for all purposes.

TECHNICAL FIELD

The disclosure relates generally to memory systems, and more particularly to assisted cache data placement.

BACKGROUND

The present background section is intended to provide context only, and the disclosure of any concept in this section does not constitute an admission that said concept is prior art.

Shortages in computer memory can cause a number of issues, including slow and/or unpredictable system performance, low memory errors, inability to run multiple programs. Memory shortages in high-performance computing (HPC) systems can cause nodes to crash when a job uses more than its allocated memory or shares a node with other jobs. Additional issues can include increased system latency and decreased system bandwidth, negatively impacting the performance of applications and system scalability. Memory shortages can impact the reliability, accessibility, and serviceability of large-scale clusters, and can increase data volatility, putting data at risk of being lost if the system fails.

The above information disclosed in this Background section is only for enhancement of understanding of the background of the disclosure and therefore it may contain information that does not constitute prior art.

SUMMARY

In various embodiments, the systems and methods described herein include systems, methods, and apparatuses for assisted cache data placement. In some aspects, the techniques described herein relate to a method, wherein: the first identifier includes a first storage policy identifier, and the second identifier includes a second storage policy identifier. In some aspects, the techniques described herein relate to a method, wherein storing the first data in the first storage location includes storing the first data in a first set of storage blocks of the storage device based on the first data being associated with a rate at which a first cache block fulfills requests for files in the first cache block.

In some aspects, the techniques described herein relate to a method, wherein: the first data is moved from the first cache block, and a data size of the first cache block is configured to match a data size of the first set of storage blocks.

In some aspects, the techniques described herein relate to a method, further including storing a third data that is moved from the cache to a second set of storage blocks of the storage device based on the third data being associated with a rate at which a second cache block fulfills requests for files in the second cache block different from the rate at which the first cache block fulfills requests for files in the first cache block.

In some aspects, the techniques described herein relate to a method, wherein: the third data is moved from a second cache block, and a data size of the second cache block is configured to match a data size of the second set of storage blocks.

In some aspects, the techniques described herein relate to a method, wherein the first storage location includes a set of storage blocks of the storage device associated with data that is determined to satisfy a frequent access threshold.

In some aspects, the techniques described herein relate to a method, wherein the second storage location includes a set of storage blocks of the storage device associated with data that is determined to satisfy an infrequent access threshold.

In some aspects, the techniques described herein relate to a method, wherein the aspect of the first data includes at least one of a rate at which the cache fulfills a request for the first data or the first data being determined to be data moved from the cache.

In some aspects, the techniques described herein relate to a method, wherein the aspect of the second data includes at least the second data being determined to be data routed to the storage device instead of the cache based on the policy of the cache.

In some aspects, the techniques described herein relate to a storage device including: a microcontroller to: assign a first identifier to first data based on an aspect of the first data, the first data being data moved from a cache to the storage device; and assign a second identifier to second data based on an aspect of the second data, the second data being moved to the storage device based on a policy of the cache; a first storage location of the storage device to store the first data based on the first identifier; and a second storage location of the storage device to store the second data based on the second identifier.

In some aspects, the techniques described herein relate to a storage device, wherein: the first identifier includes a first storage policy identifier, and the second identifier includes a second storage policy identifier.

In some aspects, the techniques described herein relate to a storage device, wherein storing the first data in the first storage location includes storing the first data in a first set of storage blocks of the storage device based on the first data being associated with a rate at which a first cache block fulfills requests for files in the first cache block.

In some aspects, the techniques described herein relate to a storage device, wherein: the first data is moved from the first cache block, and a data size of the first cache block is configured to match a data size of the first set of storage blocks.

In some aspects, the techniques described herein relate to a storage device, wherein the storage device is further configured to store a third data that is moved from the cache to a second set of storage blocks of the storage device based on the third data being associated with a rate at which a second cache block fulfills requests for files in the second cache block different from the rate at which the first cache block fulfills requests for files in the first cache block.

In some aspects, the techniques described herein relate to a storage device, wherein: the third data is moved from a second cache block, and a data size of the second cache block is configured to match a data size of the second set of storage blocks.

In some aspects, the techniques described herein relate to a storage device, wherein the first storage location includes a set of storage blocks of the storage device associated with data that is determined to satisfy a frequent access threshold.

In some aspects, the techniques described herein relate to a non-transitory computer-readable medium storing code that includes instructions executable by a processor of a device to: assign a first identifier to first data based on an aspect of the first data, the first data being data moved from a cache to a storage device; assign a second identifier to second data based on an aspect of the second data, the second data being moved to the storage device based on a policy of the cache; store the first data in a first storage location of the storage device based on the first identifier; and store the second data in a second storage location of the storage device based on the second identifier.

In some aspects, the techniques described herein relate to a non-transitory computer-readable medium, wherein: the first identifier includes a first storage policy identifier, and the second identifier includes a second storage policy identifier.

In some aspects, the techniques described herein relate to a non-transitory computer-readable medium, wherein storing the first data in the first storage location includes storing the first data in a first a set of storage blocks of the storage device based on the first data being associated with a rate at which a first cache block fulfills requests for files in the first cache block.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods of assisted cache placement described herein include multiple advantages and benefits. For example, the described systems and methods of storing cache bypassed data and evicted data separately based on flexible data placement (FDP) placement identifiers reduces the write amplification factor (WAF). Also, the described systems and methods extend the lifetime of SSD storage devices. The described systems and methods also result in improved SSD performance.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings, wherein:

FIG. 8 depicts a flow diagram illustrating an example method associated with the disclosed systems, in accordance with example implementations described herein.

FIG. 9 depicts a flow diagram illustrating an example method associated with the disclosed systems, in accordance with example implementations described herein.

FIG. 10 depicts a flow diagram illustrating an example method associated with the disclosed systems, in accordance with example implementations described herein.

Figure 1:
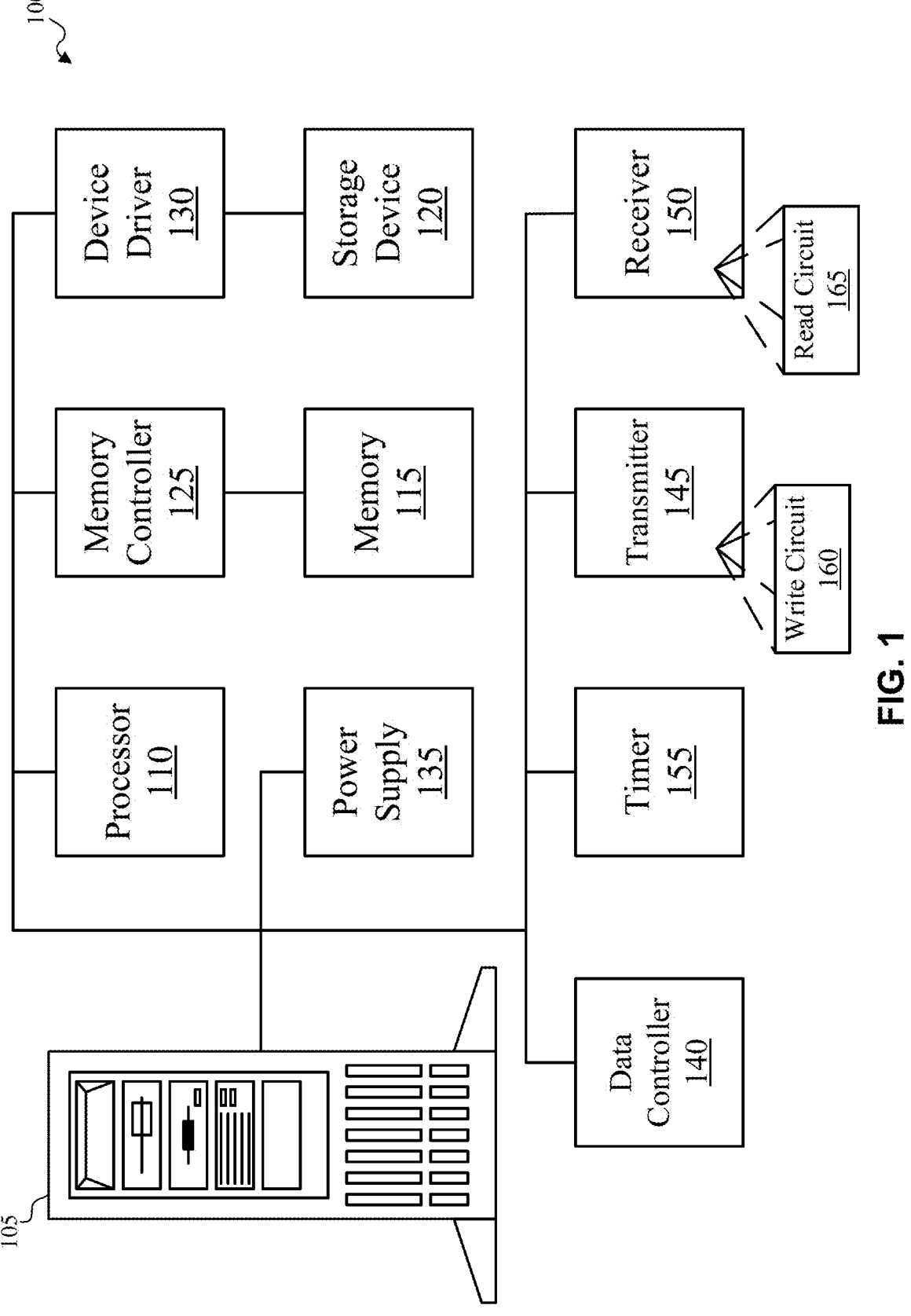
FIG. 1 illustrates an example system in accordance with one or more implementations as described herein.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD- ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods may include solid-state drives (SSDs). SSD can include storage devices used in computers that stores data on solid-state flash memory (e.g., NAND flash memory). NAND flash is a non-volatile storage technology that stores data without requiring power. NAND flash may be referred to as a memory chip. Flash memory cards and SSDs use multiple NAND flash memory chips to store data.

Some aspects of the systems and methods may be based on cache memory. Cache memory may include a form of computer memory. Cache can include in one or more levels (e.g., L1, L2, L3, etc.). A cache may be partitioned into blocks, also referred to as lines. A cache miss is an event in which a system or application makes a request to retrieve data from a cache, but that specific data is not currently in cache memory. Contrast this to a cache hit, in which the requested data is successfully retrieved from the cache. For example, if a processor requests data, the processor may send a request to a cache of the processor for the data. If the cache has a copy of the data in its storage, then the request results in a cache hit. In contrast, if a copy of the data is not currently in the cache, this request results in a cache miss. The request is then delayed as the request is then moved to a slower non-volatile storage device for the original data.

Some aspects of the systems and methods may be based on hot data and/or cold data. In data management, "hot" data is data that is frequently accessed and/or in high demand (e.g., as determined by a host or by a data controller based on a frequent access threshold, greater than an access threshold, greater than or equal to an access threshold, etc.), while "cold" data includes data that is infrequently accessed and/or infrequently in demand (e.g., set and forget data, as determined by the host or by the data controller based on an infrequent access threshold, less than an access threshold, less than or equal to an access threshold, etc.). In some cases, a system may include a frequent access threshold and/or an infrequent access threshold, where hot data satisfies the frequent access threshold and/or does not satisfy the infrequent access threshold, or where cold data satisfies the infrequent access threshold and/or does not satisfy the frequent access threshold.

Hot data can include data that is regularly in demand, data in transit or regularly in transit, and/or data that is stored for relatively short periods of time. Data hotness may be the relative degree of how often data is accessed or requested. Hot data may be stored on media designed for rapid access, with multiple connections and high performance. Cold data may be stored on media with relatively slow access times. Cold storage is ideal for data that needs to be retained for extended periods and/or unlikely to change, such as historical records, compliance data, and legal documents. Thus, hot storage is for data needed quickly or accessed frequently, and cold storage is typically used for data you rarely need. Cold storage solutions often come with robust data security features, including encryption, access controls, and redundancy. Cold cloud storage is comparatively less expensive than warm or hot storage, but cold storage has a higher per-operation cost than other kinds of cloud storage.

SSDs can work with a computer's memory (random-access memory (RAM)) and processor to access and use data. This includes files like operating systems, programs, documents, games, images, media, etc. SSDs are permanent or non-volatile storage devices, meaning SSDs maintain stored data even when power to the computer is off. SSDs may be used as secondary storage in a computer's storage hierarchy.

In an SSD, a page is the smallest unit, while a block is the smallest unit of access. A page may be 4 kilobytes (KB) in size. Pages are made up of several memory cells and are the smallest unit of an SSD. Several pages on the SSD may be summarized to a block. A block is the smallest unit of access on an SSD (e.g., reading, writing, erasing, etc.). In some examples, 128 pages may be combined into one block, where a block includes 512 KB. A block may be referred to as an erase unit. The size of a block or erase unit determines the garbage collection (GC) granularity of the SSD (e.g., at the SSD software level). The logical block address (LBA) is the standard used to specify the address for read and write commands on an SSD. Most SSDs report their LBA size as 512 bytes, even though they use larger blocks physically. These blocks are typically 4 KiB, 8 KiB, or sometimes larger.

Unlike a hard disk drive (HDD), SSDs and other NAND flash storage may not overwrite existing data. SSDs can go through a program/erase cycle. SSD garbage collection (GC) is an automated process that improves the write performance of SSDs. The goal of garbage collection is to periodically optimize the drive so that it runs efficiently and maintains performance throughout its life. With SSD garbage collection, the SSD (e.g., a storage controller or storage processing unit of the SSD) searches for pages that have been marked as stale (e.g., data that is out-of-date, obsolete, or no longer accurate). The SSD copies data still in use to a new block, and then deletes all data from the old one. The SSD marks the old data as invalid and writes the new data to a new physical location.

Some aspects of the systems and methods may include computational storage. Computational storage is a storage device architecture that allows data to be processed at the storage device level. Computational storage adds compute resources (e.g., processing units) to storage devices. Computational storage is also known as in-situ processing or in-storage compute. Computational storage devices have processors that can execute specific computational functions directly within the storage hardware. This allows for the ability to perform selected computing tasks within or adjacent to a storage device, rather than the central processor of a server or computer. Thus, computational storage reduces the amount of data that needs to move between the storage plane and the compute plane. Computational storage adds compute to storage in ways that drive efficiencies and enable enhanced complementary functions. Computational storage architectures improve application performance and infrastructure efficiency.

Some aspects of the systems and methods may be based on non-volatile memory express (NVMe). NVME can be a data transfer protocol for SSDs and flash storage. NVMe can improve speed and performance of computer systems. NVMe may be designed to use the PCI Express (PCIe) bus to connect SSD storage to servers and/or processors (e.g., central processing units).

Some aspects of the systems and methods may be based on write amplification (WA). WA can include a phenomenon that occurs when the amount of data written to storage media is more than the intended amount. This can happen in flash memory and solid-state drives (SSDs). WA occurs when a host computer writes more logical data than the amount of physical data written. In other words, WA occurs when the actual amount of written physical data is more than the amount of logical data that is written by the host computer. WA can be caused by a disconnect between the device and the host. The host may not have enough information to understand the device's physical layout or know about data that is often used together. WA can negatively affect the performance and durability of storage and can also shorten the life cycle of a device. WA may be referred to as write amplification factor (WAF), a multiplier that can be applied to data during write operations. WAF is the factor by which written data is amplified. WAF may be calculated by dividing the amount of data written to flash media by the amount of data written by the host. An ideal SSD has a WAF of 1.0. A WAF of 1 indicates there is no write amplification. SSDs may use wear leveling to evenly distribute writes across the drive, which can lead to write amplification. SSDs may use garbage collection to reclaim unused space, which can also lead to write amplification.

Some aspects of the systems and methods may include multi-stream SSDs. Multi-stream SSDs can group data by their expected lifetimes and store each group in a separate area called a stream. Multi-streaming can be used to minimize the frequency of copy-back and initialization operations.

Some aspects of the systems and methods may include cache or cache memory. Cache memory can include a hardware and/or software component that stores data so that future requests for that data can be served faster. A cache may temporarily store data used by processors, storage devices (e.g., computational storage, processor-near-memory SSD), servers, applications, browsers, etc., to speed load times. The data stored in a cache may be the result of an earlier computation or a copy of data stored elsewhere. A cache hit can occur when a computer's processor finds data it is seeking in cache memory. This happens when a program requests data from memory, and the processor first looks in the cache. If the memory location matches one of the tags in a cache entry, the result is a cache hit and the data is retrieved from the cache.

Some aspects of the systems and methods may be based on a cache hit rate. The cache hit rate can be the percentage of cache hits divided by the number of memory requests made to the cache over a period of time (e.g., a rate at which a cache fulfills requests for files in the cache). In some cases, the cache hit rate can be a measure of how effective a cache is, which is a temporary storage area for frequently accessed data. A high cache hit rate can indicate efficiency. In some examples, the hit ratio can indicate the proportion of data fetches from the cache that result in a hit. A hit (e.g., cache hit) can mean the data was found in the cache, while a miss (e.g., cache miss) can mean the data needs to be fetched from the source. The hit ratio can be calculated by dividing the number of cache hits by the total number of lookups (hits+misses). A cache block serves as the unit for insertion or eviction in a cache. A cache block hit rate may be based on the hit rate of evicted data blocks. In some cases, the cache block hit rate may be calculated based on the number of cache hits for a given block divided by the total number of cache hits.

Some aspects of the systems and methods may be based on a memory eviction policy. A memory eviction policy can include an algorithm that determines how to manage data in a memory. Memory eviction is a feature where file data blocks in memory are removed when usage exceeds a soft quota, creating space for new files. Web browsers, for example, store images, code, fonts, icons and other items to help pages load rapidly. This cache space can fill up relatively quickly. Eviction algorithms decide which items to keep in the cache and which to evict. A memory eviction policy uses knowledge of activity in the memory, along with any configuration provided at startup, to determine which if any data blocks should be evicted. A least recently used (LRU) policy may be used where an item used the least recently is removed. A first in first out (FIFO) algorithm may be used when the use of an element makes it less likely to be used in the future. A time to leave (TTL) algorithm may be used where each data entry (e.g., data block, cache entry, etc.) is stamped with an expiration date. Once the time limit lapses, the data is evicted, no matter how frequently or recently it was accessed. A least frequently used (LFU) policy may be used where a data entry that is used the least number of times is removed. In some cases, a memory eviction policy may be configured to evict data when a data metric and/or access metric corresponding to the data satisfies an eviction threshold or other eviction criteria for selectively removing the data from memory (e.g., volatile memory, cache, etc.). In some cases, a cache may evict data in a block of data, which may be referred to as a cache block (CB), eviction candidate block, or eviction CB.

Some aspects of the systems and methods may be based on a cache admission policy. A cache admission policy may be based on using a hit ratio or frequency to decide whether to add new objects to the cache. For example, when objects are evicted from the LRU queue, their access frequency is examined, and if the frequency is high enough (e.g., satisfies a frequency threshold), the object is added admitted to the cache. In some cases, a cache admission policy may be based on cache bypass. Cache bypass is a technique that automatically avoids caching data that have a low cache hit ratio. Write-around SSD caching is a data processing technology that bypasses the SSD cache by writing data directly to primary storage. The data is then copied to the cache when it has been identified as "hot" (e.g., frequently accessed data). This method has the advantage of only caching data that is likely to benefit the most from being stored in cache. SSD cache, or flash caching, is a feature that stores "hot" frequently accessed data on SSD storage. SSD cache improves the speed of data requests by storing data on NAND flash memory chips in an SSD. SSD cache may be used for host reads, for example.

Some aspects of the systems and methods may be based on flexible data placement (FDP) in relation to cache memory and/or SSD storage. In some cases, cache bypassed data and evicted data are mixed and stored in the same flash block. However, bypassed data and evicted data have different lifetimes (hotness), which can result in write amplification (WA) (e.g., based on bypassed data and evicted data being stored together in the same flash block). The described techniques include storing cache bypassed data and evicted data in different storage locations. For example, the described techniques include storing cache bypassed data and evicted data in different reclaim units (e.g., different FDP reclaim units in SSD storage, a set of storage blocks, a set of blocks in NAND flash). To achieve this, the described techniques enhance cache admission and cache eviction to support FDP (e.g., support an FDP interface). In one or more examples, FDP is supported (e.g., an FDP interface is supported) based on FDP being enabled in the SSD device. In some cases, FDP may be enabled based on implementing a firmware update on the SSD. FDP can be a feature of NVMe devices that aims to improve performance by reducing write amplification. FDP can give a host server more control over where data resides within an SSD by enabling the host to provide hints to the device when write requests occur. For example, the host might provide hints in write commands to indicate where to place the data via virtual handle or pointer. FDP's use-cases can be similar to other NVMe features, such as Streams and zoned namespaces (ZNS). ZNS separates the logical address space into fixed-sized zones. ZNS devices divide functionality between the device controller and host software.

Some aspects of the systems and methods may be based on a reclaim unit (RU), which can be a unit of NVM storage. Data from an application may be written to an RU, which is also known as a block or blocks (e.g., 128 pages or 512 KB block). A host system tells the SSD where to put data. For example, data from an application may be written to an application-specific area of the SSD, to a so-called reclaim unit. An RU may include one or more physical NAND blocks. It is noted that without FDP, data from different applications is written across all the blocks. A reclaim unit can correspond to a physical memory unit and/or a logical memory unit.

In some examples, FDP may be configured to manage the data in the granularity of a reclaim unit that includes one or more physical NAND flash blocks of an SSD. Unlike the techniques described herein, multi-stream SSDs have no control of how to store the data of a stream. In some cases, FDP may be configured to expose data management to a cache, thus making cache aware of the erase unit of an SSD (e.g., at resolution of a block). Based on the FDP exposing data management, an eviction algorithm may be optimized, such as evicting data in batches (e.g., at the resolution of a reclaim unit).

FDP is a data placement technology that can reduce data fragmentation in SSDs. An FDP-enabled SSD exposes block information as a reclaim unit (RU) to a host. As a result, an application is enabled to leverage this block information by tagging a write to a specific RU using an FDP placement identifier (PID). In some examples, the PID may be determined by a number of cache hits for an evicted data block against total cache hit number of other blocks in the cache. In some cases, the PID may be based on the hit rate of the evicted cache block. Since an application has a better understating of its data lifetime, the application can optimize its data storage by separating hot data and cold data in different RUs (e.g., a first set of one or more RUs for hot data and a second set of one or more RUs for cold data). As a result, write amplification is reduced, resulting in improved SSD performance and increased SSD lifetime.

Some approaches to SSD data placement of cache result in cache bypassed data and evicted data being stored in the same NAND block of an SSD. Cache is a faster storage device than SSD. Cache memory can be static RAM (SRAM) and/or dynamic RAM (DRAM), while an SSD may include flash memory. A cache admission policy is a door keeper of the cache. The admission policy filters out cold data that the system determines is not likely to be revisited during the life of the data in cache. When cache is full, some data may be selected by a cache replacement algorithm and evicted from cache to SSD. However, for some systems, the evicted data and the filtered out data (e.g., bypassed data) are stored together in the same SSD physical block, resulting in inefficient use of SSD memory, increased SSD latency, increased write amplification factor (WAF). Such approaches reduce the lifetime of SSD storage devices and reduce SSD performance.

Some approaches to SSD data placement of cache result in write amplification that may be caused by storing hot and cold data in the same NAND block (e.g., same erase unit). For example, at time 0, Block A includes pages a, b, c, d, and e:

Block A at time 0: [(a)(b)(c)(d)(e)]; a/c=hot data; b/d/e=cold data;

Pages a and c contain hot data while pages b, d, and e contain cold data. As a result, the "hot" data of pages a and c is likely to be updated, while the "cold" data of pages b, d, and e is likely to remain unchanged for a given period of time.

At time 1, Block A is selected as a garbage collection (GC) candidate. For example, at time 1, the version of pages a and c in Block A are out of data and the data in pages a and c are invalidated due to an update (e.g., an update to pages a and c):

Block A at time 1: [(a\*)(b)(c\*)(d)(e)]; a/c=\*invalidated; b/d/e=cold data;

Accordingly, Block A is selected as a GC candidate based on pages a and c in Block A being out-of-date data (e.g., invalid or stale data). Because a block of flash memory is not capable of doing in-place update (e.g., updating page a and page c in Block A), at time 1+(e.g., some time after time 1) the updated data for pages a and c is written to another block (e.g., Block C):

Block C at time 1+: [(a)(c)( )( )( )]; new version of a/c.

However, pages b, d and e of Block A are still valid (e.g., fresh data). Thus, at time 1+(e.g., some time after time 1, before or after a and c are written to Block C) pages b, d and e are written to a new block before Block A can be erased (e.g., written to Block B, resulting in write amplification):

Block A at time 1+: [(a\*)(b)(c\*)(d)(e)]; a/c=\*invalidated; b/d/e remain in Block A;

Block B at time 1+: [(b)(d)(e)( )( )]; b/d/e copied to Block B.

Accordingly, the data movement from Block A to Block B causes write amplification since pages b, d and e are now written twice in two separate blocks of NAND.

The systems and methods described herein include logic (e.g., data controller logic, logic of one or more data controllers) to provide assisted cache placement. The logic includes any combination of hardware (e.g., at least one memory and/or at least one processor), logical circuitry, firmware, and/or software to provide assisted cache placement.

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. Processor 110 may include cache memory (e.g., one or more levels of cache, e.g., L1, L2, L3). It is noted that processor 110, along with the other components discussed below, are shown outside the machine for ease of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may include cache memory (e.g., at least a portion of cache memory of machine 105). Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. Storage device 120 may include cache memory (e.g., at least a portion of cache memory of machine 105). When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115.

Machine 105 may include power supply 135. Power supply 135 may provide power to machine 105 and its components. Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, cache, memory 115, and/or storage device 120. In a similar manner, receiver 150 may include read circuit 165, which may be used to read data from storage, such as a register, cache, memory 115, and/or storage device 120. In some examples, data controller 140 may perform one or more operations in conjunction with write circuit 160 and/or read circuit 165. In some cases, data controller 140 may incorporate at least a portion of write circuit 160 and/or read circuit 165.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (Open-CAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, data controller 140 functionality, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components of data controller 140 may be implemented as a system-on-chip (SOC).

Data controller 140 may include cache memory (e.g., at least a portion of cache memory of machine 105).

In some examples, data controller 140 may include any one or combination of logic (e.g., logical circuit), hardware (e.g., processing unit, memory, storage), software, firmware, and the like. In some cases, data controller 140 may perform one or more functions in conjunction with processor 110. In some cases, at least a portion of data controller 140 may be implemented in or by processor 110 and/or memory 115. The one or more logic circuits of data controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable data controller 140 to provide assisted cache data placement.

In one or more examples, data controller 140 may provide assisted cache placement (e.g., cache data separation and storage). Data controller 140 provides multiple advantages and benefits based on the techniques described herein. For example, data controller 140 stores cache bypassed data and evicted data separately based on an identifier (e.g., based on FDP placement identifiers). Thus, data controller 140 reduces a write amplification factor (WAF) associated with cache data placement. Also, the cache data separation and storage operations of data controller 140 extend the lifetime of an associated SSD storage device, resulting in improved SSD performance.

Figure 2:
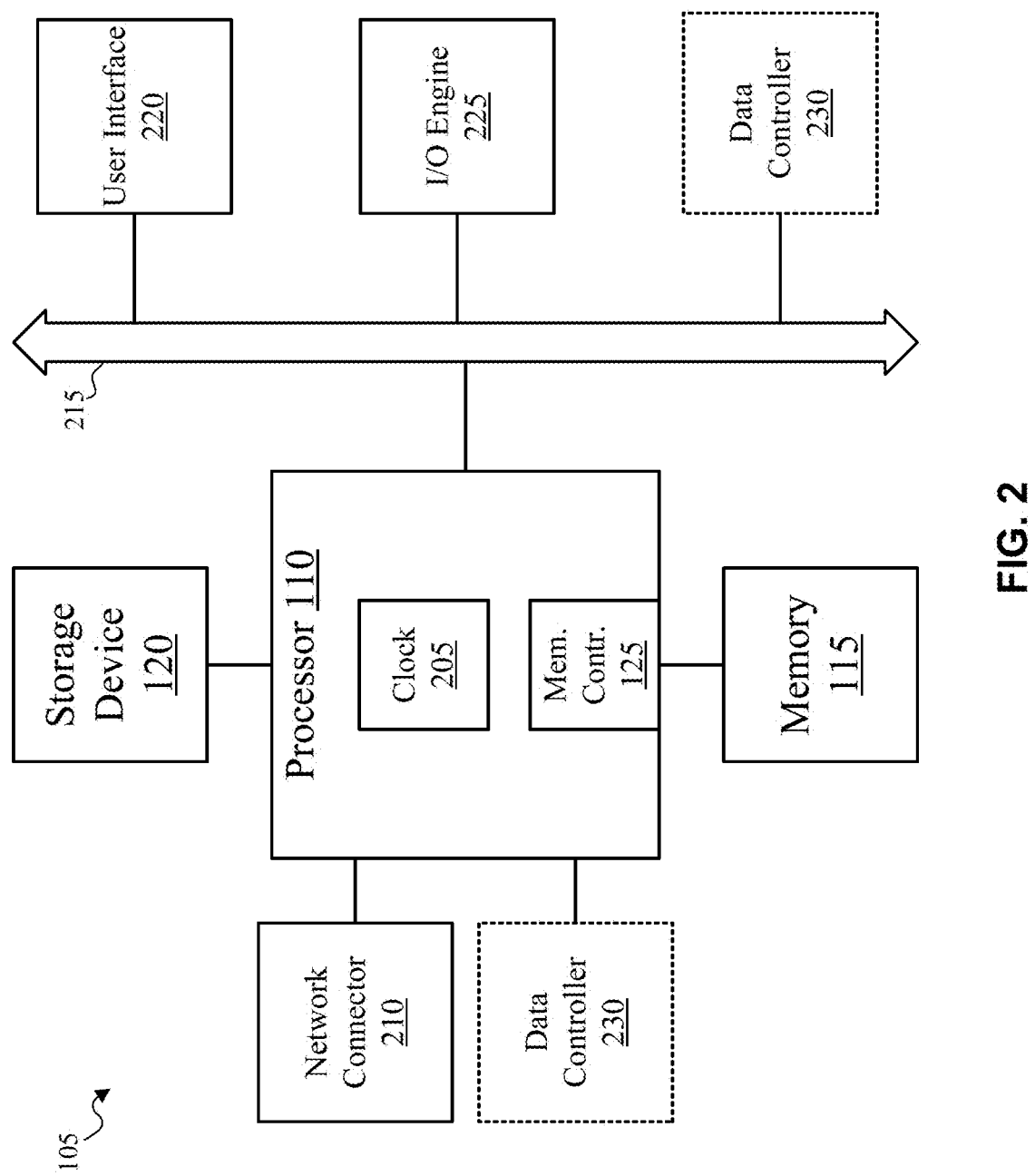
FIG. 2 illustrates details of the system of FIG. 1, according to one or more implementations as described herein.

FIG. 2 illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to data controller 230, which may be an example of data controller 140 of FIG. 1. Additionally, or alternatively, processors 110 may be connected to buses 215, to which may be attached data controller 230.

Figure 3:
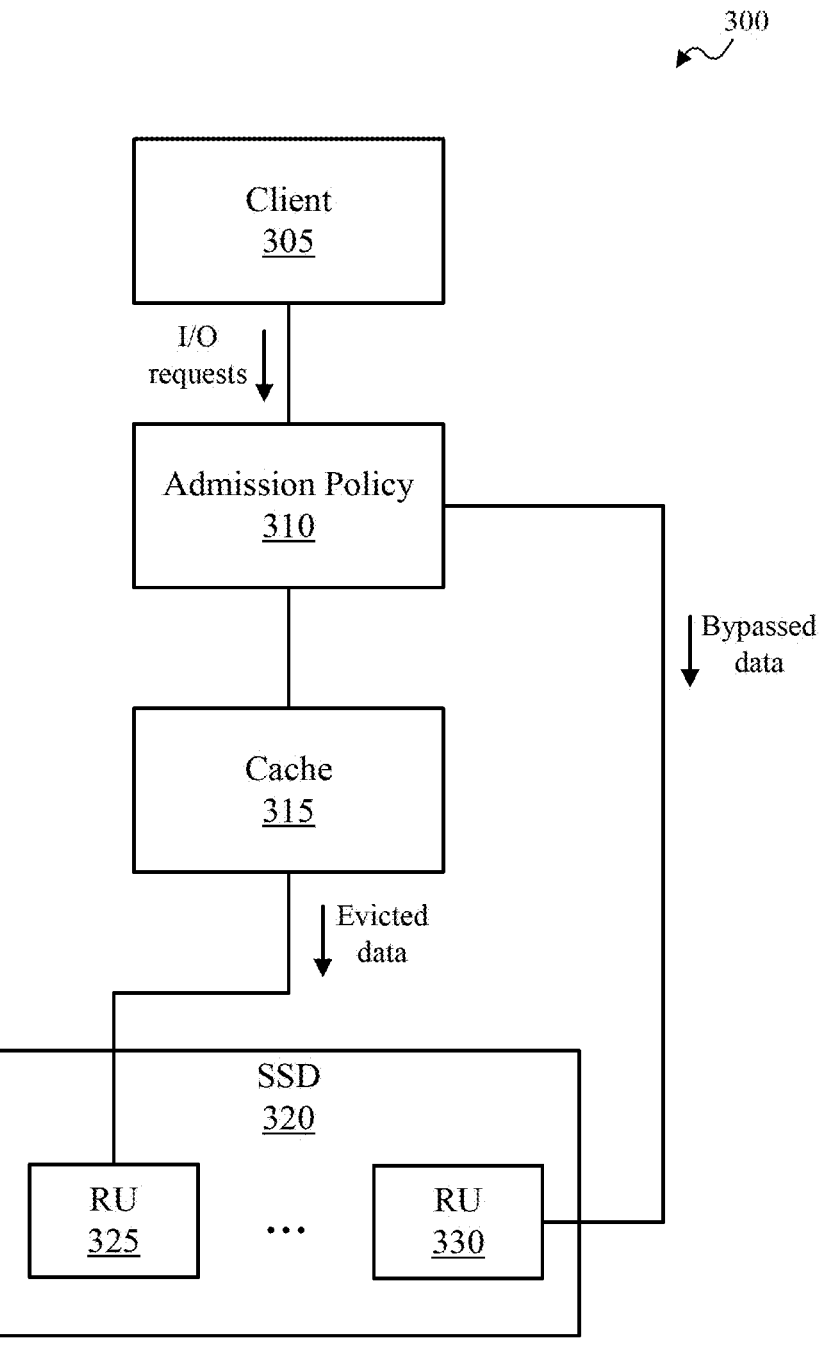
FIG. 3 illustrates an example system in accordance with one or more implementations as described herein.

FIG. 3 illustrates an example system 300 in accordance with one or more implementations as described herein. System 300 illustrates one example of FDP-assisted cache data placement. System 300 addresses write amplification by providing assisted cache data placement (e.g., FDP-based assisted cache data placement). In the illustrated example, system 300 may include client 305, admission policy 310, cache 315, and SSD 320. As shown, SSD 320 may include one or more reclaim units (e.g., RU 325, RU 330). In some examples, system 300 may include one or more data controllers (e.g., data controller 140, data controller 230) configured to perform one or more operations described herein. In some cases, client 305, cache 315, and/or SSD 320 may include at least one data controller. In some cases, system 300 may include one or more data controllers between client 305 and admission policy 310, between admission policy 310 and cache 315, and/or between cache 315 and SSD 320.

In the illustrated example, machine 105 (e.g., host system, client) may send one or more I/O requests to cache 315 via an I/O interface. The one or more I/O requests may include at least one write request, read request, and/or update request. As shown, I/O requests may be handled based on admission policy 310. In some examples, cache 315 may include at least a portion of admission policy 310. In some cases, admission policy 310 may be implemented in conjunction with and/or incorporated at least partially in one or more data controllers (e.g., data controller 140, data controller 230) and/or one or more cache (e.g., cache 315).

As shown, admission policy 310 may cause some data to bypass cache 315. As shown, bypassed data may be diverted from cache 315 and directed to SSD 320 via admission policy 310. As shown, bypassed data may be diverted to SSD 320 and stored in RU 330.

As shown, admission policy 310 may cause other data stored in cache 315 to be evicted from cache 315. As shown, this cached data may be evicted from cache 315 and moved to SSD 320. As shown, evicted data may be evicted from cache 315, moved to SSD 320, and stored in RU 325, separately from bypassed data.

In some examples, data bypassed by admission policy 310 may be tagged with a first FDP placement identifier (e.g., PID 0) and data evicted from cache 315 may be tagged a second FDP placement identifier (e.g., PID 1). Evicted data may be stored in RU 325 based on the evicted data being tagged with PID 1. Bypassed data may be stored in RU 330 based on the bypassed data being tagged with PID 0. System 300 may be configured to treat data that is bypassed by admission policy 310 as cold data, and treat data that is evicted from cache 315 as hot data. In some cases, data of system 300 may be stored in cache 315, one or more DRAM of system 300 (e.g., system DRAM, client DRAM, SSD DRAM), NVM storage, and/or SSD 320. In some cases, DRAM bypassed data may be considered colder than cached data in cache 315. Additionally, or alternatively, NVM bypassed data may be considered warmer than DRAM bypassed data. As shown, data evicted from cache 315 are tagged with a first placement ID (e.g., PID 1 to RU 325). Data bypassed by admission policy 310 are tagged with a second placement ID (e.g., PID 0 to RU 330). Accordingly, data with different hotness are stored separately in a storage device of system 300 (e.g., SSD 320).

In one or more examples, data controller 140 may be configured to assign a first identifier to first eviction data based on an aspect of the first eviction data, the first eviction data being evicted from a cache (e.g., cache 315). Data controller 140 may be configured to assign a second identifier to bypassed data based on an aspect of the bypassed data, the bypassed data being bypassed by the cache based on an admission policy of the cache (e.g., admission policy 310). In some cases, data controller 140 may store the first eviction data in a first storage location of a storage device (e.g., SSD 320) based on the first identifier. Based on the second identifier, data controller 140 may store the bypassed data in a second storage location of the storage device different from the first storage location.

In some examples, the first identifier includes a first flexible data placement identifier (e.g., first storage policy identifier), and the second identifier includes a second flexible data placement identifier (e.g., second storage policy identifier). In some cases, the first storage location includes a reclaim unit of the storage device associated with hot and/or warm data, while the second storage location includes a reclaim unit of the storage device associated with cold data (e.g., data colder than the evicted data).

In some examples, the aspect of the first eviction data includes at least one of a hit rate of the first eviction data or the first eviction data being determined to be eviction data.

In some cases, the aspect of the bypassed data includes at least the bypassed data being determined to be bypassed data.

In one or more examples, storing the first eviction data in the first storage location includes storing the first eviction data in a first reclaim unit of the storage device based on the first eviction data being associated with a first cache block hit rate (e.g., hit rate of the first eviction data, a rate at which a cache fulfills requests for files in the first cache block). In some cases, data controller 140 may store a second eviction data that is evicted from the cache in a second reclaim unit of the storage device based on the second eviction data being associated with a second cache block hit rate (e.g., hit rate of the second eviction data) different from the first cache block hit rate. In some variations, the first eviction data is evicted in a first cache block, and the second eviction data is evicted in a second cache block. In some examples, a data size of the first cache block is configured to match a data size of the first reclaim unit, and a data size of the second cache block is configured to match a data size of the second reclaim unit. In some cases, the size of the second cache block may be the same size or a different size than the first cache block.

Figure 4:
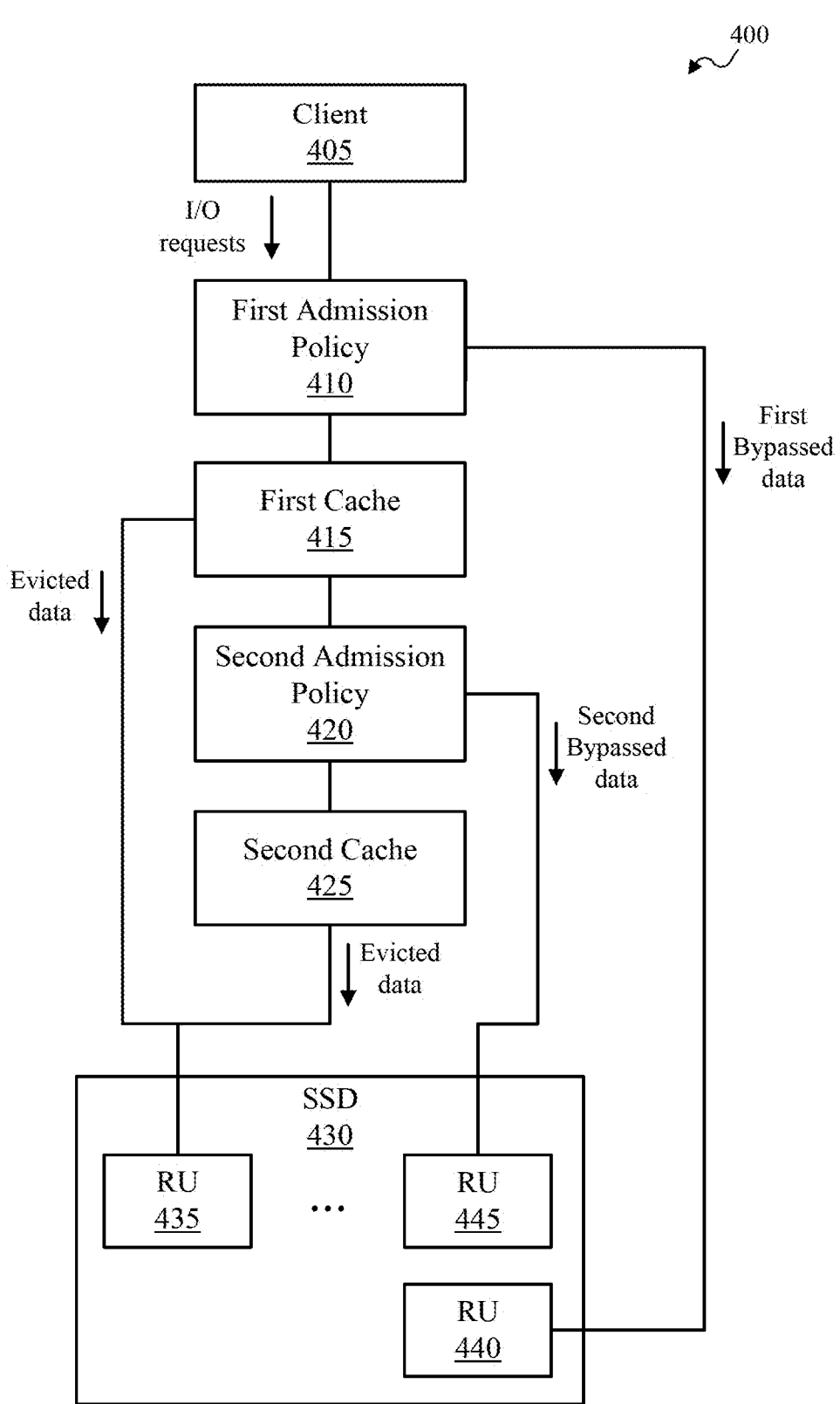
FIG. 4 illustrates an example system in accordance with one or more implementations as described herein.

FIG. 4 illustrates an example system 400 in accordance with one or more implementations as described herein. System 400 illustrates one example of FDP-assisted cache data placement. System 400 addresses write amplification by providing assisted cache data placement (e.g., FDP-based assisted cache data placement). In the illustrated example, system 400 may include client 405, first admission policy 410, first cache 415, second admission policy 420, second cache 425, and SSD 430. As shown, SSD 430 may include one or more reclaim units (e.g., RU 435, RU 440, RU 445). In some examples, system 400 may include one or more data controllers (e.g., data controller 140, data controller 230) configured to perform one or more operations described herein. In some cases, client 405, first cache 415, second cache 425, and/or SSD 430 may include at least one data controller. In some cases, system 400 may include one or more data controllers incorporated at least partially within and/or placed in between one or more components of system 400.

In one or more examples, data bypassed by first admission policy 410, bypassed by second admission policy 420, evicted from first cache 415, and/or evicted from second cache 425 may be tagged with different FDP placement identifiers (PIDs). In some examples, system 400 may treat data bypassed by second admission policy 420 (e.g., after admission to first cache 415 by first admission policy 410) to be warmer than data bypassed by first admission policy 410. Additionally, or alternatively, system 400 may treat data evicted from second cache 425 to be warmer than data bypassed by second admission policy 420. Accordingly, data evicted from first cache 415 and/or second cache 425 (e.g., evicted data) may be tagged with a first placement ID (e.g., PID 0 saved to RU 435). Data bypassed by first admission policy 410 (e.g., first bypassed data) may be tagged with a second placement ID (e.g., PID 1 saved to RU 440). Data bypassed by second admission policy 420 (e.g., second bypassed data) may be tagged with a third placement ID (e.g., PID 2 saved to RU 445). Accordingly, data with varying levels of hotness may be stored separately in the storage device (e.g., SSD). In some examples, system 400 may treat data evicted by first cache 415 to be warmer than data evicted by second cache 425. In some cases, system 400 may treat data evicted by second cache 425 to be warmer than data evicted by first cache 415.

Figure 5:
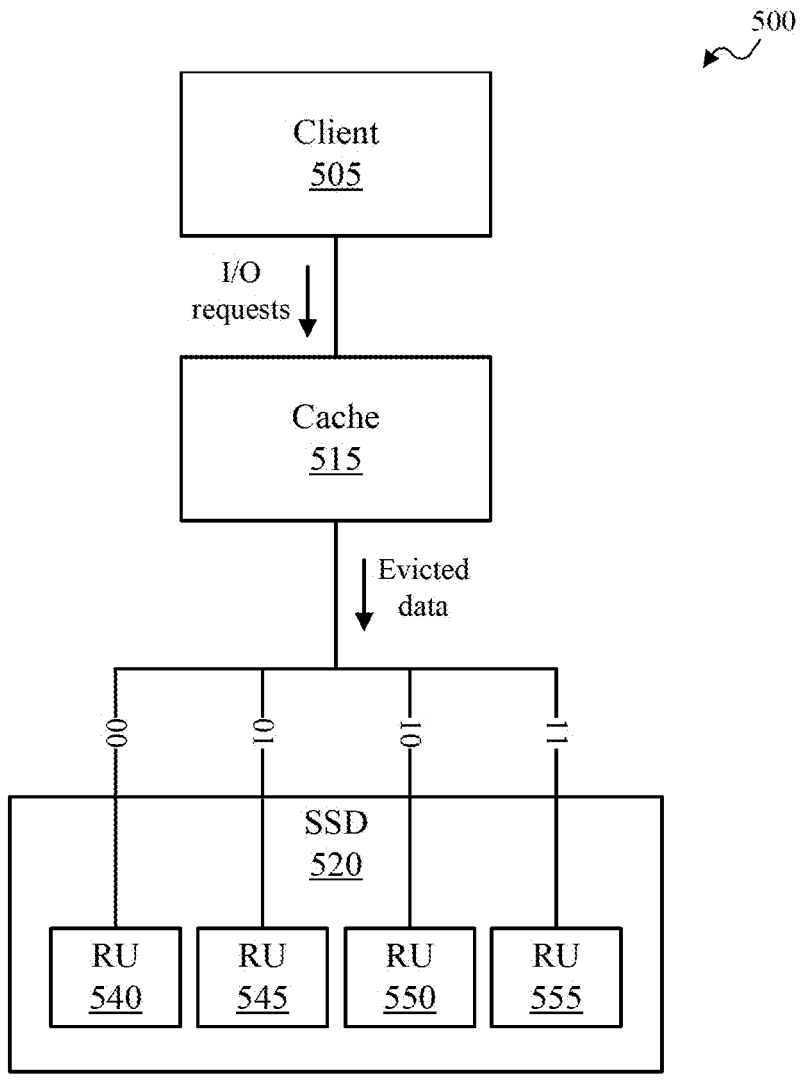
FIG. 5 illustrates an example system in accordance with one or more implementations as described herein.
Figure 5:
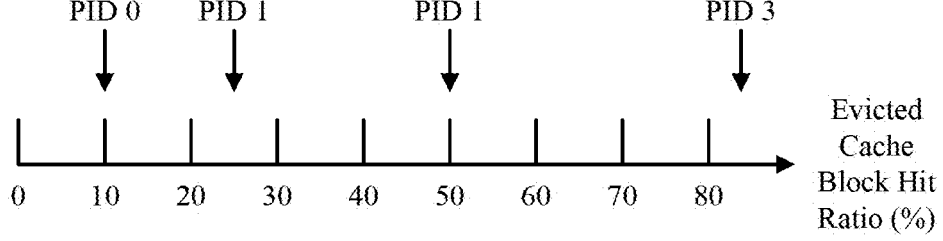

FIG. 5 illustrates an example system 500 in accordance with one or more implementations as described herein. System 500 illustrates one example of FDP-assisted cache data placement. System 500 addresses write amplification by providing assisted cache data placement (e.g., FDP-based assisted cache data placement). In the illustrated example, system 500 may include client 505, cache 515, and SSD 520. As shown, SSD 520 may include one or more reclaim units (e.g., RU 540, RU 545, RU 550, RU 555). In some examples, system 500 may include one or more data controllers (e.g., data controller 140, data controller 230) configured to perform one or more operations described herein. In some cases, client 505, cache 515, and/or SSD 520 may include at least one data controller. In some cases, system 500 may include one or more data controllers between client 505 and cache 515 and/or between cache 515 and/or SSD 520. In some cases, system 500 may include one or more data controllers incorporated at least partially within and/or placed in between one or more components of system 500.

In the illustrated example, cache 515 may be configured to track a hit rate of data in cache 515. Cache 515, in conjunction with a processing unit (e.g., in conjunction with one or more data controllers) may be configured to assign an FDP PID to eviction data based on the hit rate of that eviction data. For example, cache 515 may determine a first cache block hit rate for a first set of eviction data (e.g., hit rate of the first set of eviction data) and assign a first PID to the first set of eviction data based on the first cache block hit rate. Similarly, cache 515 may determine a second cache block hit rate for a second set of eviction data (e.g., hit rate of the second set of eviction data) and assign a second PID to the second set of eviction data based on the second cache block hit rate. As shown, PID 0 may be indicated by binary value 00, PID 1 by binary value 01, PID 2 by binary value 10, and PID 3 by binary value 11.

In the illustrated example, cache 515 may assign PID 0 (0b00) for evicted data with cache block hit rates from 0 to 10%, assign PID 1 (0b01) for evicted data with cache block hit rates from 10 to 25%, assign PID 2 (0b10) for evicted data with cache block hit rates from 25 to 50%, and assign PID 3 (0b11) for evicted data with cache block hit rates from 50 to 85%, etc. (e.g., for a given period of time). It is noted that system 500 illustrates one example of assigning PIDs based on cache block hit rates. Other ranges may be used for each PID (e.g., PID 0 (0b00) for cache block hit rates from 0 to 20%, and so on). Additionally, or alternatively, more or less PIDs may be implemented in a given system (e.g., cache block hit rates divided between two PIDs, cache block hit rates divided between five PIDs, etc.).

Figure 6:
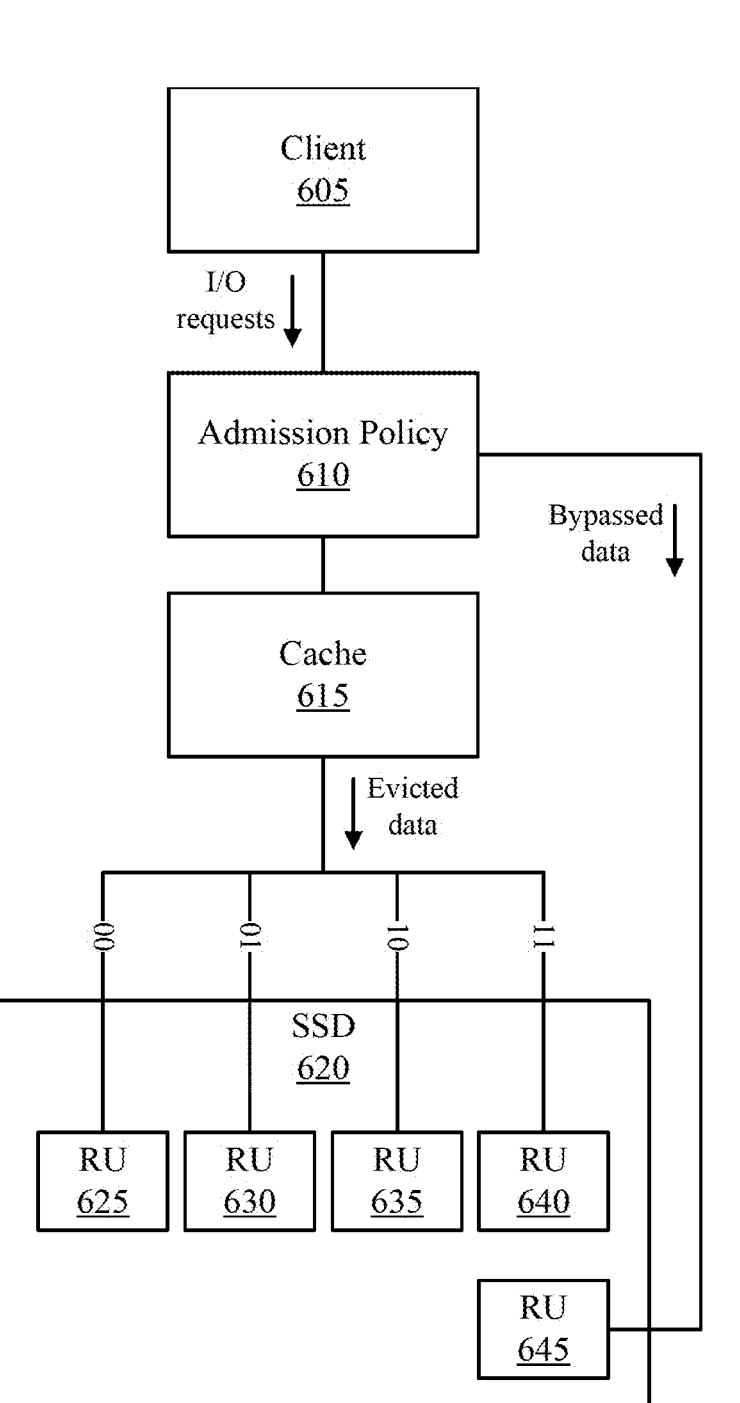
FIG. 6 illustrates an example system in accordance with one or more implementations as described herein.

FIG. 6 illustrates an example system 600 in accordance with one or more implementations as described herein. System 600 illustrates one example of FDP-assisted cache data placement. System 600 addresses write amplification by providing assisted cache data placement (e.g., FDP-based assisted cache data placement). In the illustrated example, system 600 may include client 605, admission policy 610, cache 615, and SSD 620. As shown, SSD 620 may include one or more reclaim units (e.g., RU 625, RU 630, RU 635, RU 640, RU 645). In some examples, system 600 may include one or more data controllers (e.g., data controller 140, data controller 230) configured to perform one or more operations described herein. In some cases, client 605, cache 615, and/or SSD 620 may include at least one data controller. In some cases, system 600 may include one or more data controllers incorporated at least partially within and/or placed in between one or more components of system 600.

In the illustrated example, cache 515, in conjunction with a processing unit (e.g., one or more data controllers), may be configured to assign one or more first FDP PIDs (e.g., PID 0, PID 1, PID 2, PID 3) based on the hit rate of eviction data (e.g., data evicted from cache 615 that system 600 considers warm data). Similar to system 500 of FIG. 5, cache 615 may assign PIDs to eviction data based on a determined cache block hit rate associated with each set of eviction data For example, cache 615 may assign PID 0 to eviction data with 0 to 15 cache hits, assign PID 1 to eviction data with 15 to 30 cache hits, assign PID 2 to eviction data with 30 to 60 cache hits, and assign PID 3 to eviction data with 60 to 90 cache hits, etc.). Evicted data assigned PID 0 may be stored in RU 625. Evicted data assigned PID 1 may be stored in RU 630. Evicted data assigned PID 2 may be stored in RU 635. Evicted data assigned PID 3 may be stored in RU 640.

In some examples, cache 615, in conjunction with the processing unit, may be configured to assign an additional PID (e.g., PID 4) different from eviction data PIDs to bypassed data (e.g., data system 600 considers cold data, or data colder than evicted data).

Figure 7:
FIG. 7 illustrates an example system in accordance with one or more implementations as described herein.
Figure 7:
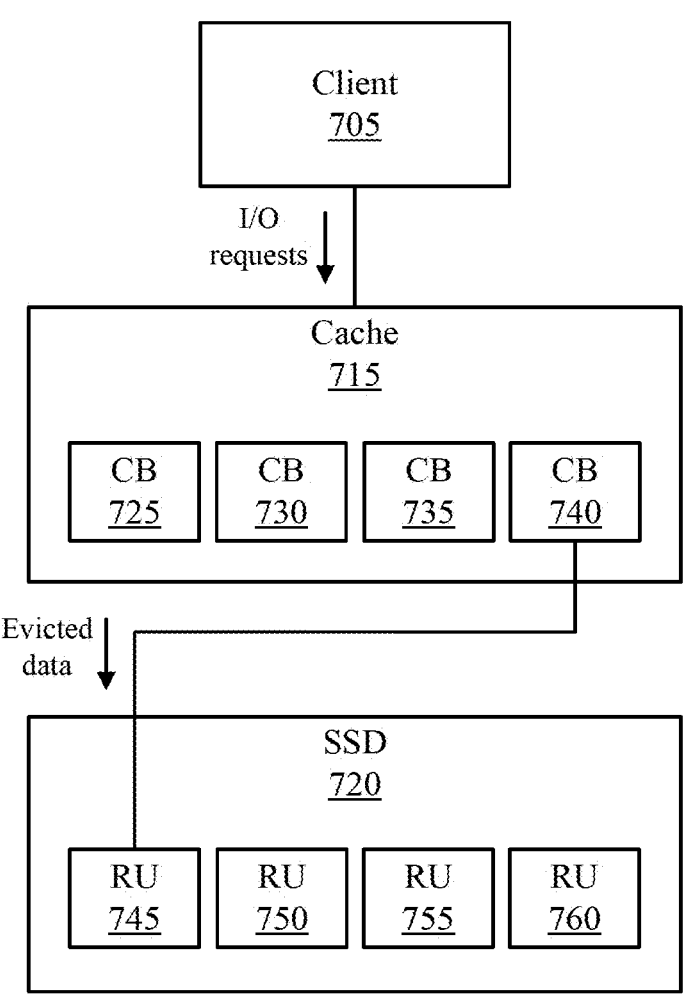

FIG. 7 illustrates an example system 700 in accordance with one or more implementations as described herein. System 700 illustrates one example of FDP-assisted cache data placement. System 700 addresses write amplification by providing assisted cache data placement (e.g., FDP-based assisted cache data placement). In the illustrated example, system 700 may include client 705, cache 715, and SSD 720. As shown, cache 715 may include one or more cache blocks (e.g., CB 725, CB 730 CB 735, CB 740). As shown, SSD 720 may include one or more reclaim units (e.g., RU 745, RU 750, RU 755, RU 760). In some examples, system 700 may include one or more data controllers (e.g., data controller 140, data controller 230) configured to perform one or more operations described herein. In some cases, client 705, cache 715, and/or SSD 720 may include at least one data controller. In some cases, system 700 may include one or more data controllers between client 705 and cache 715 and/or between cache 715 and/or SSD 720. In some cases, system 700 may include one or more data controllers incorporated at least partially within and/or placed in between one or more components of system 700.

In some examples, the size of a cache block may be based on the size of an RU of SSD 720. As shown, the size of CB 740 may be configured to match the size of RU 745. Accordingly, data fragmentation is reduced or avoided in SSD 720 (e.g., cache write or delete data in the granularity of an RU). And write amplification (WA) is avoided during garbage collection (GC).

FIG. 8 depicts a flow diagram illustrating an example method 800 associated with the disclosed systems, in accordance with example implementations described herein. In some configurations, method 800 may be implemented by data controller 140 of FIG. 1, data controller 230 of FIG. 2, and/or at least one component of system 300 of FIG. 3. In some configurations, method 800 may be implemented in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include assigning a first identifier to first eviction data based on an aspect of the first eviction data, the first eviction data being evicted from a cache. For example, data controller 140 may assign a first identifier (e.g. first flexible data placement identifier) to the first eviction data based on an aspect of the first eviction data.

At 810, method 800 may include assigning a second identifier to bypassed data based on an aspect of the bypassed data, the bypassed data being bypassed by the cache based on an admission policy of the cache. For example, data controller 140 may assign a second identifier (e.g. second flexible data placement identifier) to the bypassed data based on an aspect of the bypassed data.

At 815, method 800 may include storing the first eviction data in a first storage location of a storage device based on the first identifier. For example, data controller 140 may store the first eviction data in a first storage location (e.g., first reclaim unit) of the storage device (e.g., SSD) based on the first identifier.

At 820, method 800 may include storing the bypassed data in a second storage location of the storage device based on the second identifier. For example, data controller 140 may store the bypassed data in a second storage location (e.g., second reclaim unit) of the storage device based on the second identifier.

FIG. 9 depicts a flow diagram illustrating an example method 900 associated with the disclosed systems, in accordance with example implementations described herein. In some configurations, method 900 may be implemented by data controller 140 of FIG. 1, data controller 230 of FIG. 2, and/or at least one component of system 300 of FIG. 3. In some configurations, method 900 may be implemented in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include assigning a first identifier to first eviction data based on an aspect of the first eviction data, the first eviction data being evicted from a cache. For example, data controller 140 may assign a first identifier (e.g. first flexible data placement identifier) to the first eviction data based on an aspect of the first eviction data.

At 910, method 900 may include assigning a second identifier to bypassed data based on an aspect of the bypassed data, the bypassed data being bypassed by the cache based on an admission policy of the cache. For example, data controller 140 may assign a second identifier (e.g. second flexible data placement identifier) to the bypassed data based on an aspect of the bypassed data.

At 915, method 900 may include assigning a third identifier to second eviction data based on an aspect of the third eviction data, the second eviction data being evicted from the cache. For example, data controller 140 may assign a third identifier (e.g. third flexible data placement identifier) to the second eviction data based on an aspect of the second eviction data.

At 920, method 900 may include storing the first eviction data in a first storage location of a storage device based on the first identifier. For example, data controller 140 may store the first eviction data in a first storage location (e.g., first reclaim unit) of the storage device (e.g., SSD) based on the first identifier.

At 925, method 900 may include storing the bypassed data in a second storage location of the storage device based on the second identifier. For example, data controller 140 may store the bypassed data in a second storage location (e.g., second reclaim unit) of the storage device based on the second identifier.

At 930, method 900 may include storing the second eviction data in a third storage location of the storage device based on the third identifier. For example, data controller 140 may store the second eviction data in a third storage location (e.g., third reclaim unit) of the storage device based on the third identifier.

FIG. 10 depicts a flow diagram illustrating an example method 1000 associated with the disclosed systems, in accordance with example implementations described herein. In some configurations, method 1000 may be implemented by data controller 140 of FIG. 1, data controller 230 of FIG. 2, and/or at least one component of system 300 of FIG. 3. In some configurations, method 1000 may be implemented in conjunction with machine 105, components of machine 105, or any combination thereof. The depicted method 1000 is just one implementation and one or more operations of method 1000 may be rearranged, reordered, omitted, and/or otherwise modified such that other implementations are possible and contemplated.

At 1005, method 1000 may include assigning a first identifier to first data based on an aspect of the first data, the first data being data moved from a cache to a storage device. For example, data controller 140 may assign a first identifier to first data based on an aspect of the first data, the first data being data moved from a cache to a storage device.

At 1010, method 1000 may include assigning a second identifier to second data based on an aspect of the second data, the second data being moved to the storage device based on a policy of the cache. For example, data controller 140 may assign a second identifier to second data based on an aspect of the second data, the second data being moved to the storage device based on a policy of the cache.

At 1015, method 1000 may include storing the first data in a first storage location of the storage device based on the first identifier. For example, data controller 140 may store the first data in a first storage location of the storage device based on the first identifier.

At 1020, method 1000 may include storing the second data in a second storage location of the storage device based on the second identifier. For example, data controller 140 may store store the second data in a second storage location of the storage device based on the second identifier.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), cache memory, magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples described herein set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method comprising:
assigning a first identifier to first data based in part on the first data being placed in a cache;
assigning a second identifier to second data based in part on the second data bypassing the cache;
storing the first data that is in the cache in a first storage location of a storage device based on the first identifier; and
storing the second data that bypasses the cache in a second storage location of the storage device based on the second identifier.

2. The method of claim 1, wherein:
the first identifier includes a first storage policy identifier, and
the second identifier includes a second storage policy identifier.

3. The method of claim 1, wherein storing the first data in the first storage location includes storing the first data in a first set of storage blocks of the storage device based on the first data being associated with a rate at which a first cache block fulfills requests for files in the first cache block.

4. The method of claim 3, wherein:
the first data is moved from the first cache block, and
a data size of the first cache block is configured to match a data size of the first set of storage blocks.

5. The method of claim 3, further comprising storing a third data that is moved from the cache to a second set of storage blocks of the storage device based on the third data being associated with a rate at which a second cache block fulfills requests for files in the second cache block different from the rate at which the first cache block fulfills requests for files in the first cache block.

6. The method of claim 5, wherein:
the third data is moved from a second cache block, and
a data size of the second cache block is configured to match a data size of the second set of storage blocks.

7. The method of claim 1, wherein the first storage location includes a set of storage blocks of the storage device associated with data that is determined to satisfy a frequent access threshold.

8. The method of claim 1, wherein the second storage location includes a set of storage blocks of the storage device associated with data that is determined to satisfy an infrequent access threshold.

9. The method of claim 1, wherein the first identifier is assigned to first data based on an aspect of the first data, the aspect of the first data including at least one of a rate at which the cache fulfills a request for the first data or the first data being determined to be data moved from the cache.

10. The method of claim 1, wherein the first identifier is assigned to first data based on an aspect of the first data, the aspect of the second data including at least the second data being determined to be data routed to the storage device instead of the cache based on a policy of the cache.

11. A storage device comprising:
a microcontroller to:
assign a first identifier to first data based in part on the first data being placed in a cache; and
assign a second identifier to second data based in part on the second data bypassing the cache;
a first storage location of the storage device to store the first data that is in the cache based on the first identifier; and
a second storage location of the storage device to store the second data that bypasses the cache based on the second identifier.

12. The storage device of claim 11, wherein:
the first identifier includes a first storage policy identifier, and
the second identifier includes a second storage policy identifier.

13. The storage device of claim 11, wherein storing the first data in the first storage location includes storing the first data in a first set of storage blocks of the storage device based on the first data being associated with a rate at which a first cache block fulfills requests for files in the first cache block.

14. The storage device of claim 13, wherein:
the first data is moved from the first cache block, and
a data size of the first cache block is configured to match a data size of the first set of storage blocks.

15. The storage device of claim 13, wherein the storage device is further configured to store a third data that is moved from the cache to a second set of storage blocks of the storage device based on the third data being associated with a rate at which a second cache block fulfills requests for files in the second cache block different from the rate at which the first cache block fulfills requests for files in the first cache block.

16. The storage device of claim 15, wherein:
the third data is moved from a second cache block, and
a data size of the second cache block is configured to match a data size of the second set of storage blocks.

17. The storage device of claim 11, wherein the first storage location includes a set of storage blocks of the storage device associated with data that is determined to satisfy a frequent access threshold.

18. A non-transitory computer-readable medium storing code that comprises instructions executable by a processor of a storage device to:
assign a first identifier to first data based in part on the first data being placed in a cache;
assign a second identifier to second data based in part on the second data bypassing the cache;
store the first data that is in the cache in a first storage location of the storage device based on the first identifier; and store the second data that bypasses the cache in a second storage location of the storage device based on the second identifier.

19. The non-transitory computer-readable medium of claim 18, wherein:

the first identifier includes a first storage policy identifier, and the second identifier includes a second storage policy identifier.

20. The non-transitory computer-readable medium of claim 18, wherein storing the first data in the first storage location includes storing the first data in a first set of storage blocks of the storage device based on the first data being associated with a rate at which a first cache block fulfills requests for files in the first cache block.

* * * * *